(12) United States Patent
Moffat

(10) Patent No.: US 12,136,991 B2
(45) Date of Patent: Nov. 5, 2024

(54) AERIAL VEHICLE FOR ESTABLISHING A CELLULAR NETWORK

(71) Applicant: Raytheon Systems Limited, Harlow (GB)

(72) Inventor: William Moffat, Metheringham (GB)

(73) Assignee: Raytheon Systems Limited, Essex (GB)

( * ) Notice: Subject to any disclaimer, the term of this patent is extended or adjusted under 35 U.S.C. 154(b) by 219 days.

(21) Appl. No.: 17/550,617

(22) Filed: Dec. 14, 2021

(65) Prior Publication Data

US 2022/0190909 A1 Jun. 16, 2022

(30) Foreign Application Priority Data

Dec. 14, 2020 (GB) .................................... 2019708

(51) Int. Cl.
*H04B 7/185* (2006.01)
*H04B 7/204* (2006.01)

(52) U.S. Cl.
CPC ..... *H04B 7/18504* (2013.01); *H04B 7/18506* (2013.01); *H04B 7/2041* (2013.01)

(58) Field of Classification Search
CPC ........................... H04B 7/18504; H04W 16/18
See application file for complete search history.

(56) References Cited

U.S. PATENT DOCUMENTS

| 9,681,413 B1 | 6/2017 | Zhang | |
|---|---|---|---|
| 2002/0191567 A1* | 12/2002 | Famolari | H04L 61/5014 370/335 |
| 2020/0008007 A1* | 1/2020 | Belghoul | H04W 4/50 |
| 2022/0066475 A1* | 3/2022 | Lekutai | H04W 28/18 |
| 2022/0086741 A1* | 3/2022 | Liao | H04W 4/44 |
| 2022/0159511 A1* | 5/2022 | Vivanco | H04W 28/0838 |

FOREIGN PATENT DOCUMENTS

| CN | 105223958 A | 1/2016 |
|---|---|---|
| CN | 107800469 A | 3/2018 |
| WO | 2018152491 A1 | 8/2018 |
| WO | 2019034086 A1 | 2/2019 |

OTHER PUBLICATIONS

"UAV Aided Cellular Communications with Deep Reinforcement against jamming"; Lu et al.; Apr. 23, 2019, pp. 1-6; Lu et al. (Year: 2019).*
Combined Search and Examination Report under Sections 17 and 18(3) dated Apr. 30, 2021 in connection with United Kingdom Patent Application No. 2019708.3, 8 pages.

* cited by examiner

*Primary Examiner* — Khalid W Shaheed

(57) ABSTRACT

An aerial vehicle is described. The aerial vehicle comprises a communications system comprising an antenna and a processor coupled to the antenna, the processor being configured to establish a cellular network for transferring data with a mobile device.

20 Claims, 3 Drawing Sheets

AERIAL VEHICLE FOR ESTABLISHING A CELLULAR NETWORK

CROSS-REFERENCE TO RELATED APPLICATION AND PRIORITY CLAIM

This application claims priority under 35 U.S.C. § 119 to United Kingdom Patent Application No. GB2019708.3 filed on Dec. 14, 2020, which is hereby incorporated by reference in its entirety.

DESCRIPTION

The present invention relates to an aerial vehicle for establishing a cellular network.

In environments where there exists no, or limited, cellular connectivity, it can be difficult to establish a cellular network due to the terrain, which can be the result of a natural disaster or conflict. The current solution may be to use satellite phones which allow users to communicate via a satellite network. However, satellite phones can be big and heavy, with limited functionality, users can experience noticeable delays, and there are a limited number of geosynchronous satellites which can result in downtime if a fault occurs.

Accordingly, there is a need to provide a more robust cellular network for use in areas of natural disaster, conflict or generally difficult to reach areas.

In an embodiment of the invention there is provided an aerial vehicle comprising: a communications system comprising an antenna and a processor coupled to the antenna, the processor being configured to establish a cellular network for transferring data with a mobile device.

The processor may be configured to establish a cellular network for transferring data with a plurality of mobile devices, wherein the plurality of mobile devices comprise a first User Equipment, UE, and a second User Equipment, UE, and the system enables the first UE to transfer data with the second UE.

The first UE and the second UE may be located on the ground, on a maritime vessel, or on a land vehicle (i.e. a moving platform).

The mobile device may comprise a satellite e.g., low earth orbiting LEO, or high altitude pseudo-satellites, HAP).

The communications system may be configured to periodically ping the satellite and transmit data to the satellite when a response is received from the satellite.

The system may be configured to establish a private cellular network.

The communications system may be configured to establish the cellular network independently from any other communications infrastructure.

The communications system may comprise a base band unit comprising the processor.

The base band unit may comprise one or more of a gNodeB, gNB, and an eNodeB, eNB.

The processor may be configured to identify the mobile device using an IP address received in a data packet from the mobile device.

The processor may be configured to assign an IP address to the mobile device.

The processor may be configured to determine the location of the mobile device using GPS data received therefrom.

The antenna may comprise a multi element active multiple input multiple output, MIMO, antenna.

The system may comprise a remote radio head, RRH.

The aerial vehicle may follow a predetermined flight itinerary to establish a predetermined communications footprint on the ground (i.e. an area of cellular network coverage for user on the ground). For example, the aerial vehicle may be programed to fly at a predetermined altitude, speed, and flightpath to establish a predefined footprint/area of cellular network coverage for users on the ground/moving platform/land vehicle/maritime vessel.

The aerial vehicle may be an aeroplane, an un-inhabited aircraft or a high-altitude balloon.

The cellular network may be established according one or more of the fourth generation technology standard for broadband cellular networks and the fifth generation technology standard for broadband cellular networks.

The processor may be configured to establish a cellular network for transferring data with a UE and a satellite.

The present disclosure can be understood with reference to the description of the embodiments set out below, in conjunction with the appended drawings in which.

Figure 1:
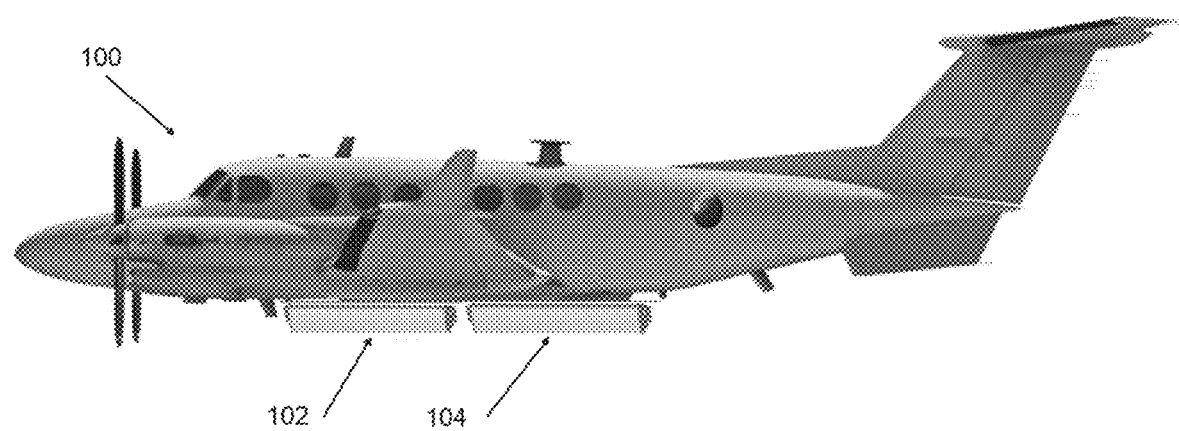
FIG. 1 illustrates an aerial vehicle according to an embodiment of the invention.

FIG. 1 illustrates an aerial vehicle 100 according to an embodiment of the invention. In the present example, the aerial vehicle 100 is an aircraft. The aerial vehicle 100 may also be a tactical and strategic aircraft, a long endurance aircraft, long endurance un-inhabited aircraft (e.g., an unmanned aerial vehicle, UAV, or a remotely piloted aircraft system, RPAS), or a high-altitude balloon (manned or unmanned), or similar.

Figure 2:
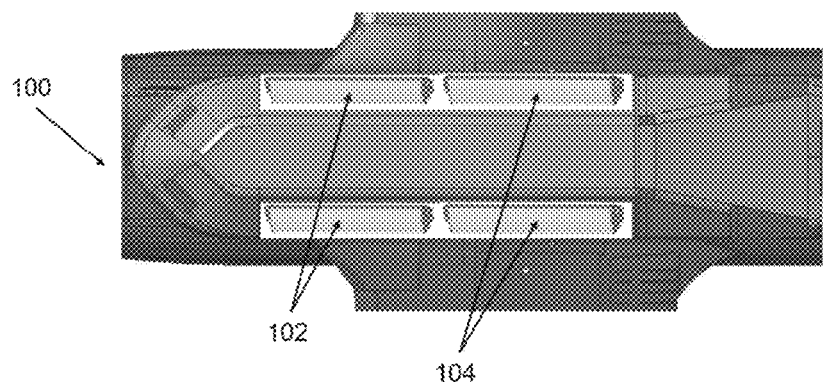
FIG. 2 illustrates a view of the underside of the aerial vehicle illustrated in FIG. 1.

The aerial vehicle 100 has, for example, four antennas 102, 104 mounted thereon, as is illustrated in FIG. 2. As is illustrated in the figure, the antennas are mounted on the bottom of the aerial vehicle and point in a downward direction (i.e. toward the ground). The antennas include two antennas 102 for operating at a frequency range suitable for 5th generation, 5G, technology standard for broadband cellular networks and two antennas 104 for operating at a frequency range suitable for 4th generation, 4G, technology standard for broadband cellular networks. It will be appreciated, that a single antenna may be used for each frequency range, and that only fifth or fourth generation technology standards may be implemented. For example, an Alpha Wireless AW3014-1 antenna (wideband small form factor 2×2 active MIMO antenna) with a frequency range of 3300-3800 MHz with a 65 degree beam width (or isotropic lens configuration) may be used to implement the 5G technology standard, and an Alpha Wireless AWS3463 antenna with a frequency range 698-960 MHz (i.e. ultra-wide low band) with a 65 degree beam width (or isotropic lens configuration) may be used to implement the 4G technology standard.

The 5G antenna mentioned herein has been selected to operate with bands 42 (3400 MHz) and 43 (3600 MHz), preferably operates with a dual cross polarisation antenna +/−45 degrees, and a beam width of 65 degrees. The 4G antenna mentioned herein has been selected to operate with 800 MHz LTE applications and a beam width of 65 degrees. The antennas have also been selected to be light, small, achieve a high power capability and provide a narrow beam width.

The antennas 102, 104 are illustrated in FIGS. 1 and 2 as being mounted on the underside of the aerial vehicle, but the antennas may be integrated into the underside of the aerial vehicle.

Figure 3:
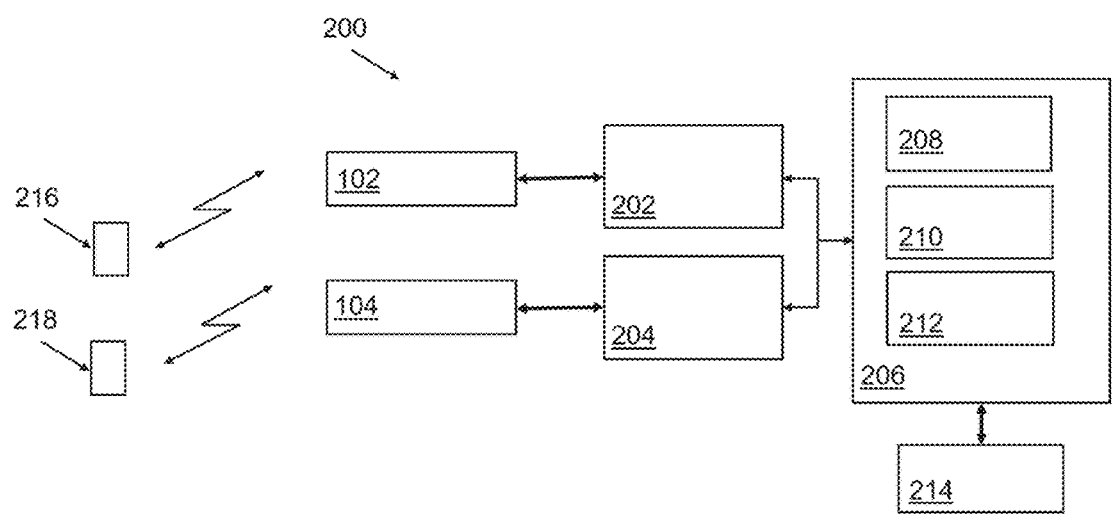
FIG. 3 illustrates a communications system of the aerial vehicle according to a further embodiment of the invention.

FIG. 3 illustrates a communications system 200 of the aerial vehicle 100. The system 200 includes the antennas 102, 104 described above, and two remote radio heads, RRH, 202, 204. The RRH 202 is coupled to the 5G antenna and the RRH 204 is coupled to the 4G antenna 104.

For example, the RRH 202 may be an Alpha Wireless AW2S Blackhawk High Power MIMO 2×2 Remote Radio Head, and the RRH 204 may be a Deltenna Black Wolf Remote Radio Head. The RRHs 202, 204 perform transmit and receive functions, filtering and amplification of received signals, and preferably include analog-to-digital or digital-to-analog convertors and up/down convertors, and may also provide advanced monitoring and control features that allow operators to optimise performance. The RRHs 202, 204 should be preferably located near to the antennas 102, 104 to reduce transmission line losses.

The system 200 of the aerial vehicle 100 also includes a base band unit 206, which includes a processor 208 (i.e. a baseband processing unit, PBU) and a remote radio unit, RRU, 210. The base band unit 206 also includes memory 212 for storing instructions executable by the professor 208. The base band unit 206 may comprise one or more of a gNodeB, gNB, and an eNodeB, eNB. Various input/output devices 214 such as a monitor and keyboard may also be connected to the base band unit 206. Although not illustrated the base band unit 206 may also receive GPS data from a navigation system of the aerial vehicle. The antennas described herein may be manually or electronically steered to maintain optimum coverage based on control signals from the base band unit 206 and the RRU 210, optionally with input from the aircraft navigation system (e.g. GPS) and/or mission software system.

The antennas described herein may implement time division duplexing, TDD, to maximise flexibility to service user equipment, UE, requirements.

The base band unit 206 includes an interface to permit raw digital radio data to be transferred between the base band unit 206 and each of the RRUs 202, 204 via a high speed data link, such as an optical data link. The base band unit 206 executes software stored on the memory 212 to generate data signals to establish a 5G, or 4G cellular network via the RRHs 202, 204. In this regard, the base band unit 206 will generate data packets for data and voice data transfer between mobile devices in accordance with the 5G and/or 4G cellular technology standards. The data packets are then passed to the RRUs 202, 204 for conversion into analogue signals which are then transmitted using at least one of the antennas 102, 104.

FIG. 3 also illustrates two mobile devices 216, 218. Each of the mobile devices 216, 218 may be referred to as a user equipment, UE, and may include a mobile handset, smartphone, tablet, laptop, portable computer, or similar devices. The UEs 216, 218 include typical communications systems to permit communication (i.e. data transfer) with the communications system 200 in accordance with the 5G and/or 4G cellular technology standards.

Each of the UEs 216, 218 will contain a pre-programmed subscriber identity module, SIM, card. In the usual manner, the SIM card will be pre-programmed, optionally using the base band unit 206, with an identification number or international mobile subscriber identity, IMSI, which will enable the UE to be identified by the base band unit 206. The SIM card will also be programmed with a mobile subscriber integrated services digital network number, MSISDN number, also known as a phone number in the art. The SIM card may also be an encrypted SIM card to allow calls to be made which are fully encrypted. The encrypted SIM may also permit the use of a randomly generated outgoing number. Further security and encryption may be implemented by the base band unit 206.

An internet protocol, IP, address will also be assigned to each UE 216, 218 by the communications system 200. The IP address may be pre-programmed whilst the UE is in close proximity to the communications system 200 before the UE is deployed, or after deployment.

Each UE 216, 218 may also include global positioning system, GPS, hardware to enable the UE to generate and transfer GPS coordinates to the communications system 200 in response to a request received therefrom (also known as pinging).

The communications system 200 will have the ability to lock and track users to maintain coverage and connectivity using the IP addresses and GPS data. For example, the base band unit 206 may periodically ping each UE 216, 218 to obtain and record (i.e. track) returned GPS data, and provide instructions to adjust the flight itinerary as appropriate, or to electronically steer the antennas to maintain optimum coverage to permit UEs 216, 218 to maintain connectivity, for example. Furthermore, the communications system 200 may ping a UE 216, 218 before transmitting data to ensure that the UE 216, 218 is within the range of the cellular network. Alternatively, the communications system 200 may periodically transmit data to the UE 216, 218 until an acknowledgment is received from the UE 216, 218, as is known in the art. The UE 216, 218 may transmit data to the communications system 200 when the UE 216, 218 determines that the communications system 200 is within range based on signal strength, for example.

Figure 4:
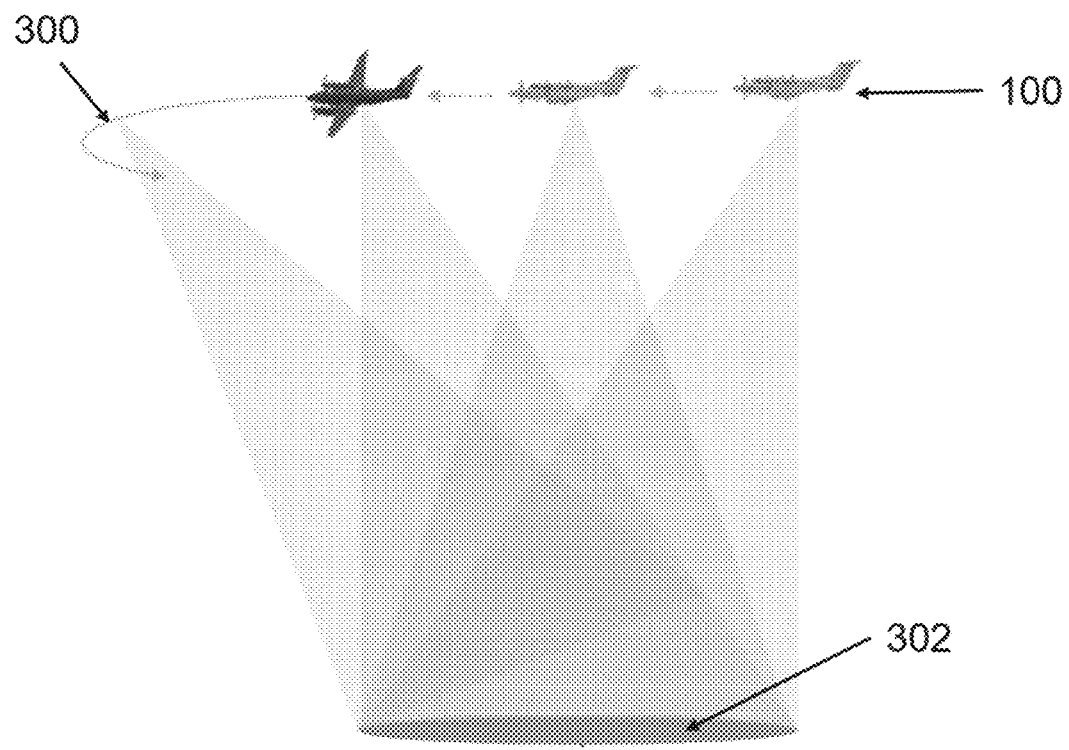
FIG. 4 illustrates a schematic of a predetermined footprint of a cellular network established according to an embodiment of the invention.

FIG. 4 illustrates a schematic of a predetermined coverage of a cellular network established according to an embodiment of the invention, and how the communications system 200 may be deployed.

To establish the cellular network, the aerial vehicle 100 is flown to a predetermined position and altitude, and is programmed to follow a predetermined flight itinerary 300 above a location 302 (i.e. an area of operations/disaster zone). The flight itinerary is generated to permit the aerial vehicle 100 to maintain an orbital flight path with a central point co-incident with a central point of the location 302 on the ground. In other words, the centre of a flight path, for example, is co-incident with a central point of an area of operations on the ground. It is envisaged that the aerial vehicle's automatic flight control systems will be programmed with the flight itinerary, but the aerial vehicle 100 may also be controlled manually according to a predetermined flight itinerary.

The flight itinerary should be designed to maintain network coverage on the ground with a predetermined area (i.e. a communications footprint) on the ground. This may be achieved by designing a flight itinerary with the smallest possible orbital flight pattern at a predetermined altitude. It will be understood by those skilled in the art that the performance of the aerial vehicle may be used to determine the orbital flightpath. To achieve this, the aerial vehicle 100 would be required to fly at a constant orbital pattern with a steady angle of bank and speed. It will be appreciated that a higher altitude may result in a bigger/greater network coverage on the ground and a lower altitude may result in a smaller/lesser network coverage on the ground.

Two example aerial vehicles 100 are provided below with an associated theoretical cellular network footprint:

Beechcraft B350:
    Max altitude: FL320/32000 feet
    Min altitude: FL100/10000 feet
    Max air speed: 300 knots (ground speed varies with wind velocity)
    At FL240/24000 feet, initial target altitude, the cellular network footprint may be a minimum of 1 km radius to a maximum 5 km radius depending on aircraft orbit size and antenna design RAF Protector Remotely Piloted Air System (RPAS) or UAS:
    Max altitude: FL450/45000 feet
    Min altitude: FL100/10000 feet
    Max airspeed: 260 knots
    Min airspeed: 180 knots
    At FL350/35000 feet, initial target altitude, the cellular network footprint may be a minimum of 2 km radius to a maximum of 7 km radius depending on aircraft orbit size and antenna design Once the aerial vehicle 100 has reached the predetermined position and altitude, and is being controlled to follow the predetermined flight itinerary 300, the communications system 200 establishes a cellular network. In other words, the communications system 200 permits the transfer of data with the UEs 214, 216 in the area of operations on the ground.

Before the communications system 200 permits the transfer of data with the UEs 214, 216, each UE 214, 216 may establish a connection with the communications system 200 using the RRC protocol, for example. Once each of the UEs 214, 216 has established a connection with the communications system 200, each UE 214, 216 is permitted to transfer data with the communications system 200 in accordance with the 5G and/or 4G cellular technology standards. In this regard, the base band unit 206 upon receipt of data (e.g. voice data or message data) for UE 214 from UE 216, for example, will route the data to UE 214 to enable UE 214 and UE 216 to transfer data therebetween. It will be appreciated that two UEs have been described herein for simplicity but that the communications system 200 could provide connectively for more mobile devices without utilizing other cellular infrastructure in a form of private cellular network (i.e. a stand-alone cellular network).

A private, secure 5G/4G stand-alone network has been described herein. This type of secure network may deliver high speed, low latency capability to multiple users. The private network may use 'network slicing' to create multiple virtual networks that can be customized and optimised for a specific service, traffic and user. Moreover, the use of the antennas described herein enables coherent beam forming gain which translates directly into reduced interference, improved coverage and low antenna side lobes.

It will be appreciated that the communications system 200 may be mounted in an un-inhabited aircraft (e.g., an unmanned aerial vehicle, UAV, or a remotely piloted aircraft system, RPAS) in the same manner described herein for an aircraft. If the communications system 200 is mounted in a high-altitude balloon, it will be appreciated that it may be possible to maintain a steady position using a GPS device, for example, without providing a planned orbital flight path.

Figure 5:
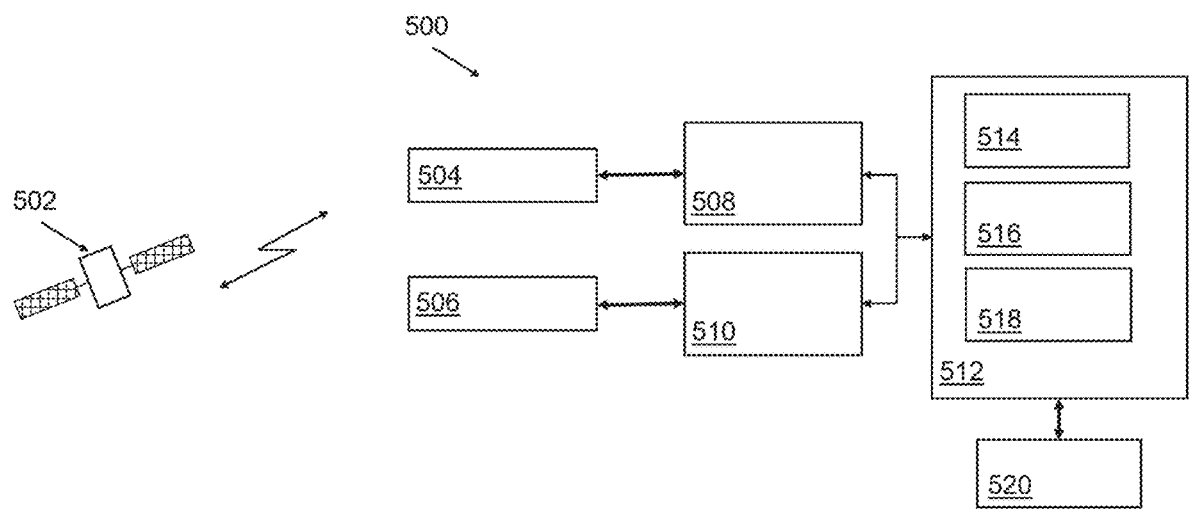
FIG. 5 illustrates a communications system of the aerial vehicle according to a further embodiment of the invention.

FIG. 5 illustrates a communications system 500 of the aerial vehicle 100. The system 500 includes, for example, two antennas 504, 506, two remote radio heads, RRHs, 508, 510, and a base band unit 512, which includes a processor 514 (i.e. a baseband processing unit, PBU), a remote radio unit, RRU, 516, and memory 518. The base band unit 512 may comprise various input/output devices 520 such as a monitor and keyboard connected thereto. The components of the communications system 500 correspond to the components of the communications system 200 described above in terms of functional units, hardware and configuration. That is the antennas 504, 506, the RRHs, 508, 510, the base band unit 512, the processor 514, the RRU 516, the memory 518 and the input/output devices 520 correspond to the antennas 102, 104, the RRHs, 202, 204, the base band unit 206, the processor 208, the RRU 210, the memory 212 and the input/output devices 214, respectively.

In FIG. 5, there is also provided a mobile device in the form of a satellite 502 (e.g. a low orbit/low altitude satellite). The satellite 502 includes systems (i.e. functional units/hardware) to permit it to communicate with the system 500 in accordance with the 5G and/or 4G cellular technology standards. The functional units/hardware may be in the form of data only hardware.

Figure 6:
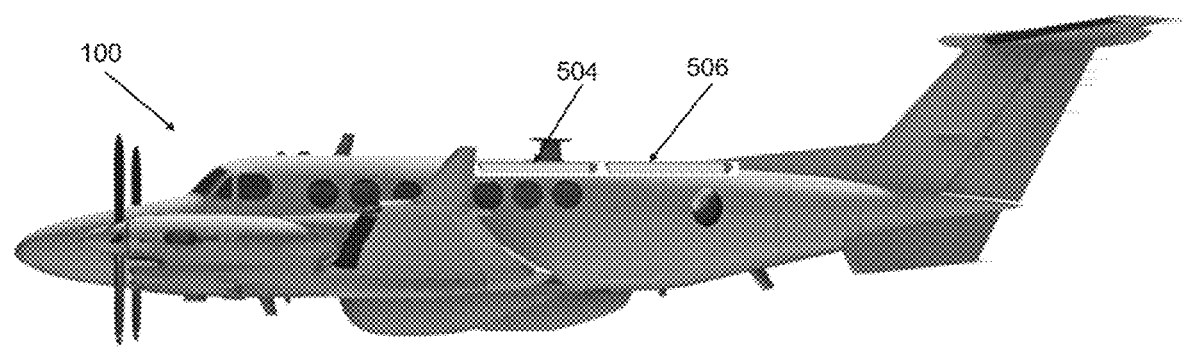
FIG. 6 illustrates an aerial vehicle according to a further embodiment of the invention.

FIG. 6 illustrates an aerial vehicle 100 according to an embodiment of the invention. In the present example, the aerial vehicle 100 includes, mounted thereon, the two antennas 504, 506. In the example illustrated in FIG. 6, the two antennas 504, 506 are mounted on the top of the fuselage of the aerial vehicle 100 so as to point in an upward direction. It will be appreciated that as for the embodiment illustrated in FIGS. 1 and 2, two of each of the antennas 504, 506 may be mounted on the aerial vehicle 100, and that only one type of antenna may be used (i.e. either a 5G or 4G compatible antenna may be used).

The communications system 500 when mounted on the aerial vehicle 100 forms a 4G/5G backhaul moving platform. The communications system 500 is configured to transmit data with (i.e. transmit and receive data) the satellite 502 in accordance with the 5G and/or 4G cellular technology standards. The transmitted data may be data destined for another communications system 200, 500 mounted on an aerial vehicle, or other moving platform (e.g. land vehicle or marine vessel) either directly, or via one or more additional satellites. Moreover, the data to be transmitted may have been received from a UE 216, 218 via communications system 200.

The aerial vehicle 100 will follow a predetermined orbital flightpath as describe above. The communications system 500 will periodically ping the satellite 502 to determine when the satellite is in range. If a response to the ping message is received the communications system 500 will transmit data to the satellite 502 in accordance with the 5G and/or 4G cellular technology standards. Similarly, the satellite 502 will transmit data to the communications system 500 when the satellite determines that the communications system 500 is within range based on signal strength, for example.

It will be understood that the satellite will establish a connection with the communications system 500 in the same manner as described above for the UEs 216, 218 (e.g. using the RRC protocol). Once the connection has been established, the satellite can transmit and receive data with the communications system 500. Furthermore, it will be understood that a single satellite has been described for simplicity, but the communications system 500 is configured to communicate with several satellites in order to maintain the transfer of data.

The functions of the communications systems 100, 500 may be combined in a single system and any duplicated, or redundant, hardware may be omitted. For example, it is envisaged that a single base band unit 206, 512 may be used, and a single set of antennas and associated RRHs might also be used. In this regard, the base band unit 206, 512 may be configured to transmit data received from one UE to a satellite to be received by a further UE via a further aerial vehicle.

The systems described herein will provide an airborne, secure, private 5G network that is backward compatible with 4G but will not require existing 4G/5G infrastructure and designed to be compatible with aircraft, RPAS, low earth orbiting, LEO, high altitude pseudo-satellites, HAPS, maritime and land systems. It will comprise a small footprint, light-weight Line Replaceable Unit (i.e. LRU—black box), antennae and an integrated (into LRU) control unit. Each of the systems 200, 500 may be located in a single LRU, or each system 200, 500 may be located in its own independent LRU. In this regard, the antennas may be located outside of the LRU. The systems described herein will be ideal for rapid deployment into an area with no communications infrastructure or where communications have been damaged due to conflict or natural disaster.

The 5G/4G backhaul described herein (e.g. communications system 500) will provide a secure, private 5G network that will allow a platform to communicate with other platforms above its current location. This will also ensure that the high speed connectivity established using the communications system 200 is maintained for LEO, HAPS and RPAS and thus overcome the limitations of satellite communications, SATCOM, (low-speed, narrow-bandwidth). The 5G/4G backhaul is an independent system that does not require an existing 4G/5G network to operate.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, hard-drives, thumb drives, memory cards, etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network), Those skilled in the art will also realise that by utilizing conventional techniques known to those skilled in the art that all, or a portion of the software instructions may be carried out by a dedicated circuit, such as a DSP (Digital Signal Processor), programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought. Any of the steps or processes described above may be implemented in hardware or software.

It will be understood that the above descriptions of preferred embodiments are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. An aerial vehicle comprising:
 a communications system comprising an antenna and a processor coupled to the antenna, the processor configured to:
   establish a cellular network for transferring data with a plurality of mobile devices, wherein the plurality of mobile devices comprises a first User Equipment (UE) and a second UE, wherein the aerial vehicle is configured to enable the first UE to transfer data with the second UE;
   identify each of the plurality of mobile devices using an Internet Protocol (IP) address received in a data packet from each of the plurality of mobile devices;
   determine locations of the plurality of mobile devices using Global Positioning System (GPS) data received from the plurality of mobile devices; and
   cause the aerial vehicle to initially follow a predetermined flight itinerary to establish a predetermined communications footprint and then adjust the flight itinerary based on the GPS data received from the plurality of mobile devices.

2. The aerial vehicle of claim 1, wherein the first UE and the second UE are located on the ground, on a maritime vessel, or on a land vehicle.

3. The aerial vehicle of claim 1, wherein the aerial vehicle is configured to establish a private cellular network.

4. The aerial vehicle of claim 1, wherein the communications system is configured to establish the cellular network independently from any other communications infrastructure.

5. The aerial vehicle of claim 1, wherein the communications system comprises a base band unit comprising the processor.

6. The aerial vehicle of claim 5, wherein the base band unit comprises one or more of a gNodeB (gNB) and an eNodeB (eNB).

7. The aerial vehicle of claim 1, wherein the processor is configured to assign an IP address to each of the plurality of mobile devices.

8. The aerial vehicle of claim 1, wherein the antenna comprises a multi-element active multiple input multiple output (MIMO) antenna.

9. The aerial vehicle of claim 1, wherein the aerial vehicle comprises a remote radio head (RRH).

10. The aerial vehicle of claim 1, wherein the aerial vehicle is an airplane, an uninhabited aircraft, or a high-altitude balloon.

11. The aerial vehicle of claim 1, wherein the processor is configured to establish the cellular network according one or more of the fourth generation technology standard for broadband cellular networks and the fifth generation technology standard for broadband cellular networks.

12. A method comprising:
    establishing a cellular network for transferring data with a plurality of mobile devices using an aerial vehicle comprising a communications system, the communications system comprising an antenna and a processor coupled to the antenna, wherein the plurality of mobile devices comprises a first User Equipment (UE) and a second UE, wherein the aerial vehicle enables the first UE to transfer data with the second UE;
    identifying, using the processor, each of the plurality of mobile devices using an Internet Protocol (IP) address received in a data packet from each of the plurality of mobile devices;
    determining locations of the plurality of mobile devices using Global Positioning System (GPS) data received from the plurality of mobile devices; and
    causing the aerial vehicle to initially follow a predetermined flight itinerary to establish a predetermined communications footprint and then adjusting the flight itinerary based on the GPS data received from the plurality of mobile devices.

13. The method of claim 12, wherein the aerial vehicle establishes a private cellular network.

14. The method of claim 12, wherein the communications system establishes the cellular network independently from any other communications infrastructure.

15. The method of claim 12, wherein the communications system comprises a base band unit comprising the processor.

16. The method of claim 12, wherein the processor assigns an IP address to each of the plurality of mobile devices.

17. The method of claim 12, wherein the antenna comprises a multi-element active multiple input multiple output (MIMO) antenna.

18. The method of claim 15, wherein the base band unit comprises one or more of a gNodeB (gNB) and an eNodeB (eNB).

19. The method of claim 12, wherein:
    the first UE and the second UE are located on the ground, on a maritime vessel, or on a land vehicle; and
    the aerial vehicle is an airplane, an uninhabited aircraft, or a high-altitude balloon.

20. The method of claim 12, wherein the cellular network is established according one or more of the fourth generation technology standard for broadband cellular networks and the fifth generation technology standard for broadband cellular networks.

* * * * *